(12) United States Patent
Heo

(10) Patent No.: US 6,690,931 B2
(45) Date of Patent: Feb. 10, 2004

(54) METHOD OF DOING A BROADCAST SERVICE OF A SHORT MESSAGE IN A COMMUNICATION SYSTEM

(75) Inventor: Cheol Kyun Heo, Kyungki-do (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/223,189

(22) Filed: Dec. 30, 1998

(65) Prior Publication Data

US 2002/0068557 A1 Jun. 6, 2002

(51) Int. Cl.⁷ .................................................. H04Q 7/20
(52) U.S. Cl. ........................ 455/414; 455/466; 455/550; 455/564
(58) Field of Search .......................... 455/414, 89, 90, 455/564, 56.1, 54.1, 54.2, 33.1, 552, 426, 550, 556, 557, 553, 456, 457, 422, 466, 418, 344, 346, 565; 440/905, 995, 915, 988; 379/210.01, 142.01, 88.08, 88.09, 88.19, 88.2, 88.21

(56) References Cited

U.S. PATENT DOCUMENTS

| | | | | |
|---|---|---|---|---|
| 5,136,636 A | * | 8/1992 | Wegrzynowics | 379/207 |
| 5,321,737 A | * | 6/1994 | Patsiokas | 379/58 |
| 5,561,704 A | * | 10/1996 | Salimando | 379/58 |
| 5,579,535 A | * | 11/1996 | Orlen et al. | 455/33.1 |
| 5,703,934 A | * | 12/1997 | Zicker et al. | 379/142 |
| 5,742,668 A | * | 4/1998 | Pepe et al. | 455/415 |
| 5,771,459 A | * | 6/1998 | Demery et al. | 455/517 |
| 5,812,649 A | * | 9/1998 | Shen | 379/142 |
| 5,966,652 A | * | 10/1999 | Coad et al. | 455/412 |
| 6,014,090 A | * | 1/2000 | Rosen et al. | 340/905 |
| 6,037,996 A | * | 3/2000 | Maeda et al. | 348/563 |
| 6,049,711 A | * | 4/2000 | Ben-Yehezkel et al. | 455/414 |
| 6,101,381 A | * | 8/2000 | Tajima et al. | 455/414 |
| 6,108,533 A | * | 8/2000 | Brohoff | 455/414 |
| 6,125,282 A | * | 9/2000 | Urabe | 455/552 |
| 6,133,853 A | * | 10/2000 | Obradovich et al. | 340/905 |
| 6,134,433 A | * | 10/2000 | Joong et al. | 455/417 |
| 6,151,507 A | * | 11/2000 | Laiho et al. | 455/418 |
| 6,157,815 A | * | 12/2000 | Collins et al. | 455/38.1 |
| 6,201,974 B1 | * | 3/2001 | Lietsalmi et al. | 370/337 |
| 6,230,019 B1 | * | 5/2001 | Lee | 455/412 |
| 6,292,668 B1 | * | 9/2001 | Alanara et al. | 455/466 |
| 6,370,389 B1 | * | 4/2002 | Isomursu et al. | 455/414 |
| 6,370,391 B1 | * | 4/2002 | Lietsalmi et al. | 370/337 |
| 6,400,958 B1 | * | 6/2002 | Isomursu et al. | 455/466 |
| 6,434,395 B1 | * | 8/2002 | Lubin et al. | 375/216 |

\* cited by examiner

*Primary Examiner*—Pablo N Tran
(74) *Attorney, Agent, or Firm*—Fleshner & Kim, LLP

(57) ABSTRACT

This invention relates to the method of doing a broadcast service of a short message in a communication system. According to the present invention, a transmission request message of a broadcast message including the name and telephone number of an information provider is received from the information provider through a message center. The transmission request message of the broadcast message processed in the message center is transmitted from the message center to a base station and therefrom to all terminals. The terminals receive the broadcast message including the information provider's name and telephone number and displays them on the display devices of the terminals. When the terminal user wants to communicate with the information provider, the terminal performs the process for communication between the information provider and the user by using the received information provider's telephone number.

73 Claims, 8 Drawing Sheets

FIG.2

| Field | Length(bits) |
|---|---|
| PRIORITY | 2 |
| MESSAGE_ID | 6 |
| ZONE_ID | 8 |
| SERVICE | 16 |
| LANGUAGE | 8 |

FIG.4

| subparameter | Type |
|---|---|
| Message Identifier | Optional |
| User Data | Optional |
| Mwssage Center Time Stamp | Optional |
| Validity Period-Absolute | Optional |
| Validity Period-Relative | Optional |
| Priority Indicator | Optional |
| Alert on Message Delivery | Optional |
| Language indicator | Optional |

FIG.6A

| subparameter | Type |
|---|---|
| Message Identifier | Optional |
| User Data | Optional |
| Message Center Time Stamp | Optional |
| Validity Period-Absolute | Optional |
| Validity Period-Relative | Optional |
| Priority Indicator | Optional |
| Alert on Message Delivery | Optional |
| Language indicator | Optional |
| Third Party Call number | Optional |
| Third party call name | Optional |

FIG.6B

| subparameter | Type |
|---|---|
| Message Identifier | Optional |
| User Data | Optional |
| Message Center Time Stamp | Optional |
| Validity Period-Absolute | Optional |
| Validity Period-Relative | Optional |
| Priority Indicator | Optional |
| Alert on Message Delivery | Optional |
| Language indicator | Optional |
| Third Party Call number | Optional |

METHOD OF DOING A BROADCAST SERVICE OF A SHORT MESSAGE IN A COMMUNICATION SYSTEM

BACKGROUND OF THE INVENTION

The present invention relates to a method of doing a broadcast service of a short message in a communication system.

Generally, in the service of a mobile communication system like CDMA, the broadcast message service provided to the subscribers is provided to the mobile terminal (or a mobile station) of said subscribers through paging channels and traffic channels. This broadcast message does not request the subscribers to answer whether or not the terminal receives the transmitted broadcast message because of its essential peculiarities.

Three methods exist for transmitting the broadcast message by said paging channels. First, a multi-slot broadcast transmission method sends the broadcast message to all slots of a control channel to send the broadcast message by using all the mobile terminals that are located in the service area of a base station. This is the simple and fast method having no time delay in the message. However, this method gives a large load to the control channel and makes the process of the other message impossible. The second is a multi-slot broadcast paging method. This is a method improved from the multi-slot broadcast transmission method. This method informs all the terminals of the broadcast by transmitting the general paging messages of small size instead of large to all slots of the control channel and then transmits the broadcast message. The third is a periodic broadcast paging method. This is the most effective method. This method informs the terminals of periodically transmitting the broadcast message from the base station.

After then, when a predetermined period is passed, the periodic broadcast paging method transmits the broadcast message. The first slot of the period of which all the terminals are informed is called a reference slot. During this slot, a general page message including the broadcast address to be transmitted in future is transmitted. Through this broadcast address information, the terminals recognize the type and arrival time of the message and decide whether the terminals receive the message. The broadcast message corresponding to each broadcast address is transmitted by the period of three slots following the reference slot. The terminal (or the mobile station) which receives the broadcast messages by the method as described above displays the messages on its display device. The conventional techniques are the arts based on the International Standardization IS-637 concerned with the short message and uses IS-95 for the radio communication of the message transmission between a base station and its terminals.

FIG. 1 is a block diagram showing the network configuration of a general CDMA system for the broadcast service of the short message.

In FIG. 1, the base station (BS) includes the base transceiver subsystem and the base station controller. Referring to FIG. 1, the mobile communication service basically using the CDMA system provides radio or wireline communication to the mobile communication subscribers by using the public switch telephone network(PSTN) 1 for the general telephone subscribers, which is provided by the communication network agent, and the integrated service digital network(ISDN) 2 providing communication service for both voice and data by a digital subscriber line.

A mobile switching center (MSC) 3a performs a circuit switching and a transit paging processing so that the subscriber can communicate with other mobile subscribers or general wireline subscribers by the mobile communication service and performs the functions of hand-off and roaming to provide a good quality of a communication service, and takes charge of the transport layer for the broadcast message transmission (20 in FIGS. 2 and 3).

Furthermore, the base transceiver subsystem 3b is connected with the mobile station 4, which is either in a geostationary position or in moving, by the radio communication path. Therefrom, the base transceiver subsystem 3b also connects the mobile station 4 with the device in the base station controller by radio or wireline path and takes charge of the relay layer 30 in FIGS. 3 and 4 for the broadcast message transmission.

Furthermore, the base transceiver subsystem contains the information about various kinds of mobile communication connected with the mobile switching center. Therefore, the base transceiver subsystem also contains the current position information of the mobile station 4, the state of the mobile communication subscribers, the statistical data about the mobile communication and the information concerning to various services. Both the home location register 6 to be connected with radio/wireline subscribers and the visitor location register 5 to be connected with the mobile switching center 3a in order to search the information for processing the paging from other network subscribers are included in the base transceiver subsystem 3b.

A cell broadcast center 7 which is an important element in the broadcast message transmission takes charge of the teleservice layer (10 in FIGS. 3 and 4). The short message entity (8) provides the broadcast message to said cell broadcast center 7.

The mobile communication service process of the basic network of the CDMA system in FIG. 1 is omitted and only the service for the broadcast message will be explained here.

Referring to FIG. 1, a communication network agent selects one of the three broadcast message transmission methods by the paging channels previously described.

A short message entity 8 sends the broadcast message that will be transmitted to the cell broadcast center 7 which takes charge of the teleservice layer 10. The cell broadcast center 7 sends the broadcast message to the mobile station 4 through the mobile switching center 3a which takes charge of the transport layer 20 and through the base transceiver subsystem 3b which takes charge of the relay layer 30 shown in FIGS. 2 and 3.

Said base transceiver subsystem 3b makes said broadcast message included in the data burst message and transmits it to the mobile station 4 through the paging channel by said selected broadcast message transmission method.

The multi-slot broadcast transmission method uses the data burst message. The remaining two methods, the multi-slot broadcast paging method and the periodic broadcast paging method, use a general paging message with the data burst message.

The address field in the data burst message or the general paging message is filled with the broadcast address that is the address not the inborn address of the mobile station 4 but for the broadcast message transmission. According to this broadcast address, whether or not the broadcast message is received is decided.

FIG. 2 shows the broadcast address for the broadcast message transmission in a conventional system. This address consists of two priority bits (PRIORITY), six message identification bits (MESSAGE_ID), eight zone identification bits (ZONE_ID), sixteen service bits (SERVICE) and eight language bits (LANGUAGE).

The broadcast address will be explained as follows. The two priority bits (PRIORITY) are to decide the priority of the broadcast messages to be broadcast when a plurality of broadcast messages are transmitted.

The six message identification bits (MESSAGE_ID) are to decide whether the current broadcast message is a duplicate copy of the message that has already been transmitted in order to avoid a duplicate transmission.

The eight zone bits (ZONE_ID) are to discriminate an identical message received from a plurality of zones different from each other.

The sixteen service bits (SERVICE) are used to classify the broadcast message transmission services by their items. The eight language bits (LANGUAGE) are used as language indicator bits for the classification of the languages used for the broadcast message.

FIG. 3 shows the protocol stack structure for the broadcast message transmission service.

The link layer 40 in the lowest level is a protocol layer for establishing the connection of a communication circuit for the communication service.

Relay layer 30 of which the base transceiver subsystem 3b of FIG. 1 takes charge is a protocol layer to discard, when broadcast messages having an identical broadcast address are received overlapping in time within a broadcast period, the overlapping message. Relay layer 30 also takes charge of the communication path allocation, the address establishment and release.

Transport layer 20 of which the mobile switching center 3a takes charge is a protocol layer for the broadcast message transmission between the cell broadcast center 7 and the base transceiver subsystem 3b and takes charge of the paging connection management, data classification and data flow control.

Teleservice layer 10 of which the cell broadcast center 7 takes charge is a protocol layer to provide the broadcast message transmission service by broadcast message subparameters.

The transmission of the broadcast message provided by the broadcast message subparameters of the teleservice layer 10 is achieved by the parameters provided from the transport layer 20), the relay layer 30 and the link layer 40 which are the protocol layers lower than the teleservice layer 10.

FIG. 4 shows the broadcast message subparameters of said teleservice layer 10. All the subparameters may be used optionally. Generally the subparameters of the broadcast message include a message identifier, a user data, a message center type stamp, a validity period-absolute, a validity period-relative, a priority indicator, an alert on message delivery, and a language indicator.

FIG. 5 shows the primitive type of relay layer 30 and the transport layer 20 in the structure of the protocol stack shown in FIG. 2.

There are four steps in the primitive between said two layers that are a request step requesting the processing of arbitrary work, an indication step informing of said requested work, a response step responding to said informed work, and a confirm step confirming the response to the request.

The relationship between the relay layer 30 and the transport layer 20 by the primitive is explained as follows.

After the request step requesting the broadcast message transmission in the transport layer 20, said relay layer 30 sends an indication for informing of the broadcast message transmission to the transport layer 20. At this time, the transport layer 20 responds so as to decide whether allowing the broadcast message transmission.

To the response, the transport layer 20 performs said broadcast message transmission by the confirm step of the relay layer 30.

According to the conventional arts described beforehand, the contents, for example a telephone number, corresponding to the received broadcast message is simply displayed on the display device of the terminal. Furthermore, in the case that the subscriber who receives the broadcast message is interested in the information of the received broadcast message, the subscriber must first store the displayed number. Therefore, if the subscriber inputs the number, the subscriber is automatically connected to the broadcast message provider and can confirm the information.

As described beforehand, according to the conventional technique, the information of the received broadcast message is only displayed on the LCD display of the terminal. Therefore, the following problems are presented.

First, for the case that the sender location of the received broadcast message is required to be stored in an address directory in the terminal in order to be used in the future, the displayed sender location must be memorized. Then, the user must store the memorized sender location in the address directory by using a separate process of the terminal.

Second, if the user wants to confirm the information of the received broadcast message, the user must memorize the previously displayed telephone number. Then, the user has to input the memorized telephone number by the keypad and make the connection with the information provider of the broadcast message. Therefore, memorizing and dialing the previously displayed telephone number must be vexatious processes.

Third, because of the above two inconvenient processes, the quality and efficiency of the broadcast service of the originally planned short message can decrease.

SUMMARY OF THE INVENTION

Accordingly, the present invention is directed to provide a method of doing the service of broadcast message in a communication system such that a terminal user can communicate easily and conveniently with the information provider such as the service agent providing a desired broadcast message.

Another object of the present invention is to provide a method of doing the service of the broadcast message in a communication system by which the terminal user easily stores the telephone number and name of the information provider in the address directory in the terminal so as to use it in the future.

To achieve these and other advantages and in accordance with the purpose of the present invention, as embodied and broadly described, two subparameters for the broadcast message are used additionally in the present invention.

One subparameter, the third party call name, is used for inserting the name of the information provider. The other subparameter is the third party call number for inserting the telephone number of the information provider.

The cell broadcast center makes the name and telephone number of the information provider who requests the transmission fo the broadcast message included in the broadcast message by using the two subparameters (the third party call name and the third party call number). The terminal decides whether or not there are the two subparameters in the broadcast message when receiving the broadcast message. Therefore, in the case that the subparameters are included in the broadcast message, the terminal takes the processes for achieving the above objects.

According to the present invention, in the case that the cell broadcast center receives the transmission request message of the broadcast message including the name and telephone number of the information provider from the information provider, the name and the telephone number are inserted in the two subparameters (third party call name, third party call number), respectively.

The broadcast message having the two subparameters in which the name and the telephone number of the information provider are included, respectively, by the cell broadcast center is transmitted to all terminals through the base transceiver subsystem.

When the terminal receives the broadcast messages having the subparameters in which the name and telephone number of the information provider are included, the terminal displays the contents, the telephone number and the name in the subparameters of the broadcast message on its display device in a certain sequence.

When the terminal user wants, the terminal performs the process for establishing the traffic channel between the information provider and the terminal user by using the telephone number of the received information provider.

Therefore, when the service agent transmits advertisements and public information by using the service of the short message, the terminal user can easily communicate with the information provider of the broadcast message that the user wants. Furthermore, to use them in the future, the telephone number and the name of the information can be easily stored in the address directory of the terminal.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIG. 2 is a table showing the general field parameters of the broadcast address for the transmission of the broadcast message.

FIG. 4 is a table showing the subparameters of the conventional broadcast message.

FIGS. 6A and 6B are a table showing the subparameters of the broadcast message according to the present invention.

DETAILED DESCRIPTION OF THE PREFERRED EMBODIMENT

Reference will now be made in detail to the preferred embodiments of the present invention, examples of which are illustrated in the accompanying drawings.

For the explanation of the present invention, figures used beforehand for explanation of the conventional techniques can be used.

Figure 1:
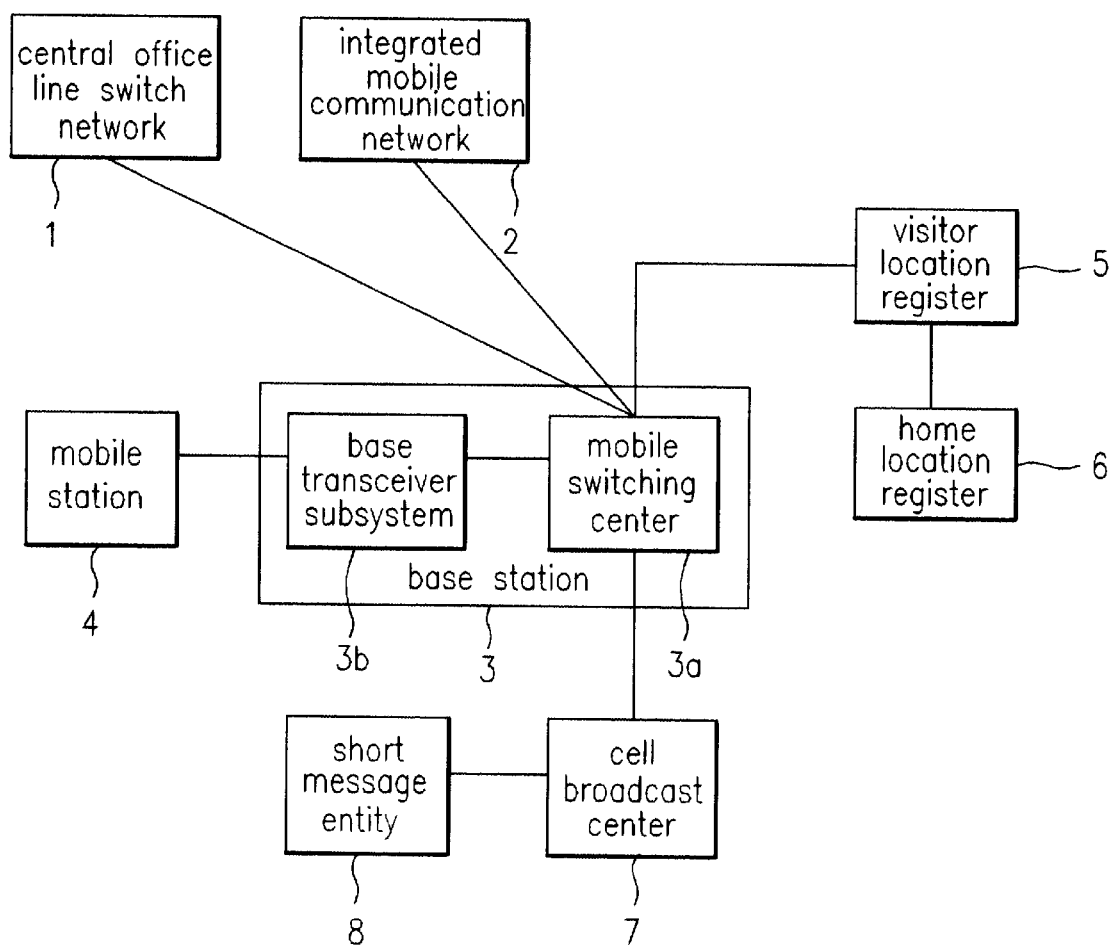
FIG. 1 is a block diagram showing the network structure of a conventional CDMA communication system.
Figure 3:
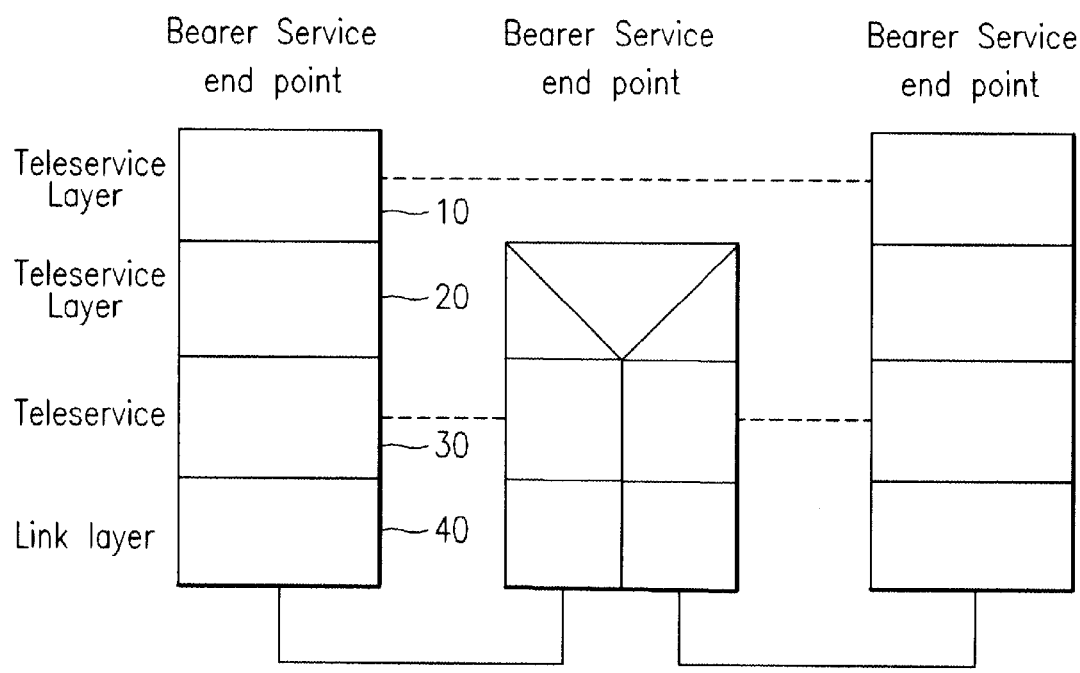
FIG. 3 is a diagram showing the structure of the protocol stack used in broadcasting the short message.
Figure 5:
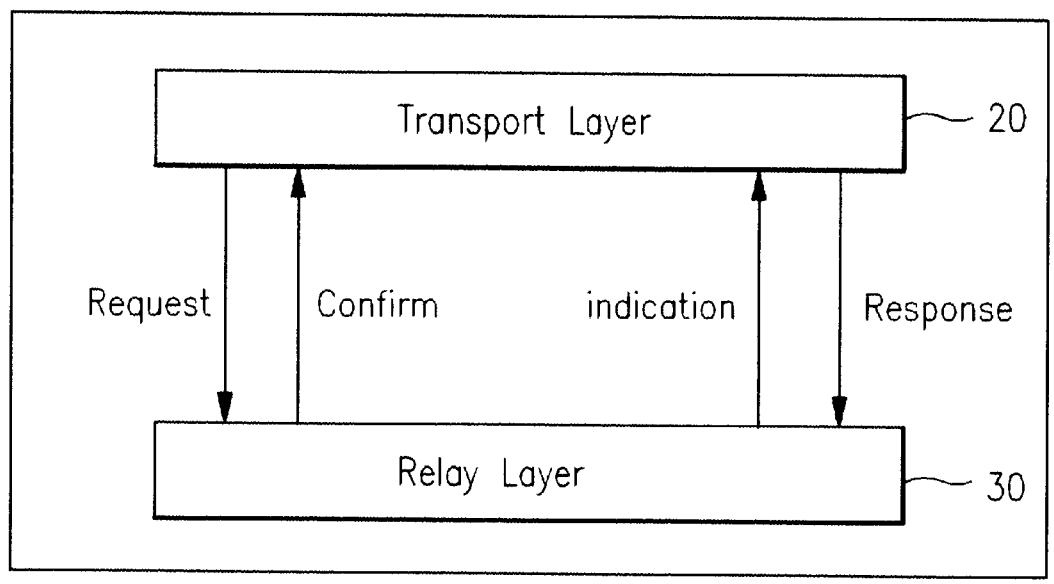
FIG. 5 is a diagram showing the primitive type between the relay layer and the transport layer among the protocol stacks used for the broadcast service of the short message.
Figure 7:
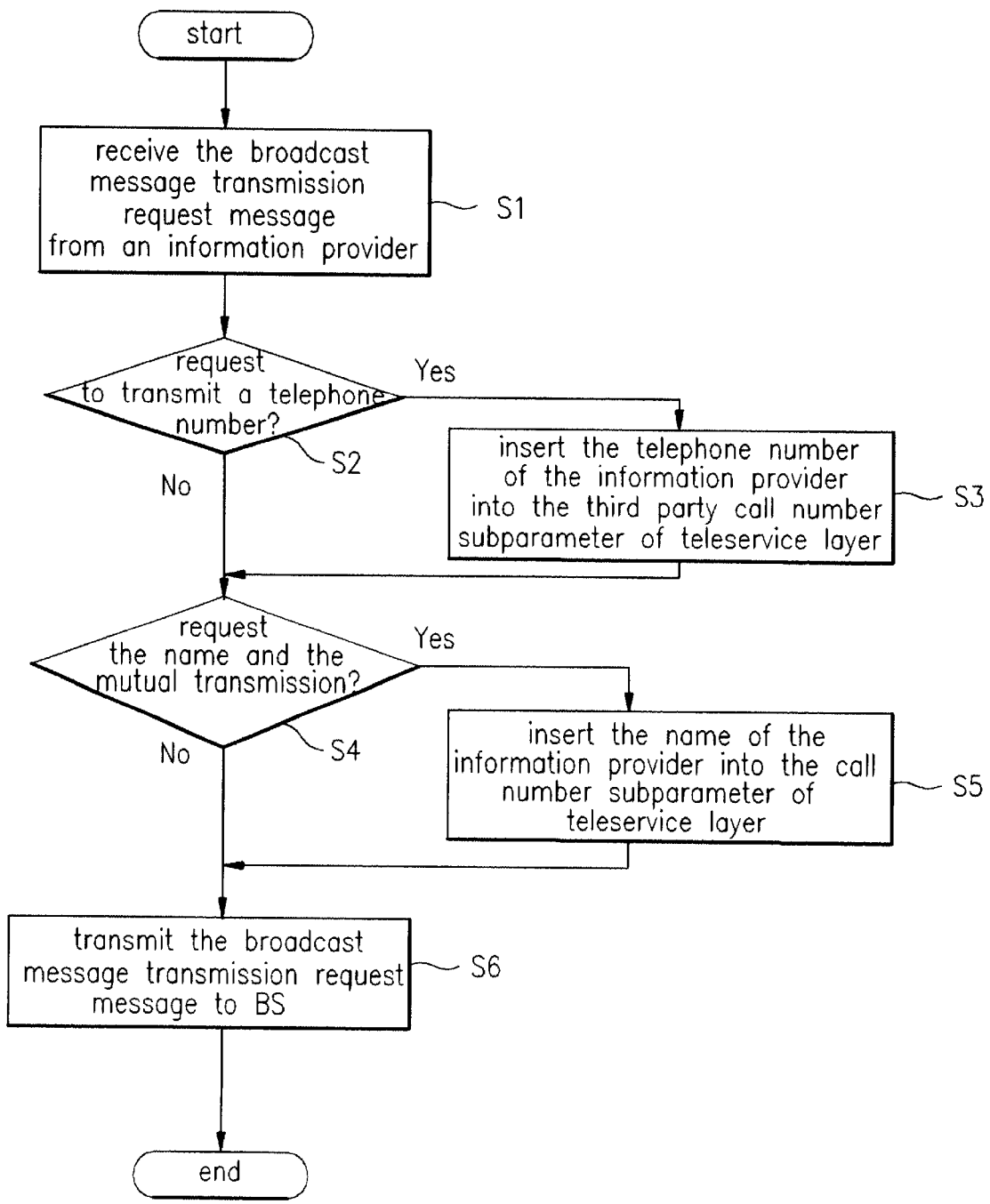
FIG. 7 is a flow chart showing the process for processing the broadcast message at a message center according to the present invention.

FIG. 6A is a table showing the subparameters of the broadcast message according to the present invention. The table in FIG. 6A has the same subparameters as the conventional broadcast message in FIG. 4 except two subparameters, the third party call number and the third party call name. In the present invention, the new two subparameters (the third party call number and the third party call name) are added to the broadcast service format of the short message used for the transmission of the broadcast message in the teleservice layer 10 of FIG. 3. As explained beforehand, the broadcast message is transmitted from the base station 3 to the mobile station. Prior to this, in order to realize the present invention, when the information provider such as the service agent wants to transmit the information, for example the sender name and the message sender location such as the telephone number, the information together with the transmission request message of the broadcast message is transmitted to the cell broadcast center 7 of FIG. 1. The cell broadcast center 7 makes the name (for example, a firm name) and telephone number of the information provider inserted into the broadcast message of the information provider by using the added two subparameters (the third party call number and the third party call name)

The broadcast message process procedure in the cell broadcast center 7 for realizing the present invention is explained as follows. First, the cell broadcast center 7 receives the transmission request message of the broadcast message from the information provider such as the service agent. Then, the information provider transmits the telephone number and the name together with the information. The cell broadcast center 7 determines whether the information provider requests to transmit both the telephone number and the name together with the information of the broadcast message. If the information provider wants to transmit both the telephone number and the name, the cell broadcast center 7 inserts the telephone number and the name into two subparameters, the third party call number and the third party call name, respectively. After then, the cell broadcast center 7 transmits the transmission request message of the broadcast message including the two subparameters (the third party call number and the third party call name) to the base station 3 of FIG. 1. The base station 3 transmits the received transmission request message of the broadcast message to the mobile station 4. In other words, if the cell broadcast center 7 receives a bearer information of the short broadcast message including the telephone number and the name from the information provider, when the broadcast message of the teleservice layer is constructed, the telephone number of the information provider is included into the subparameter third party call number and the name of the information provider is included into the subparameter third party call name. After then, the transmission request message of the broadcast message is transmitted to the base station 3 of FIG. 1.

FIG. 6B is a table showing the subparameters of the broadcast message according to the present invention. The table in FIG. 6B has the same subparameters as the conventional broadcast message in FIG. 4 except one subparameter, the third party call number. In the present invention, the new subparameter (the third party call number) is added to the broadcast service format of the short message used for the transmission of the broadcast message in the teleservice layer 10 of FIG. 3.

On the other hand, the base station 3 transmits the broadcast message requested by the cell broadcast center 7 to all the terminals 4 through the control channel (paging channel) and the traffic channel.

Figure 8:
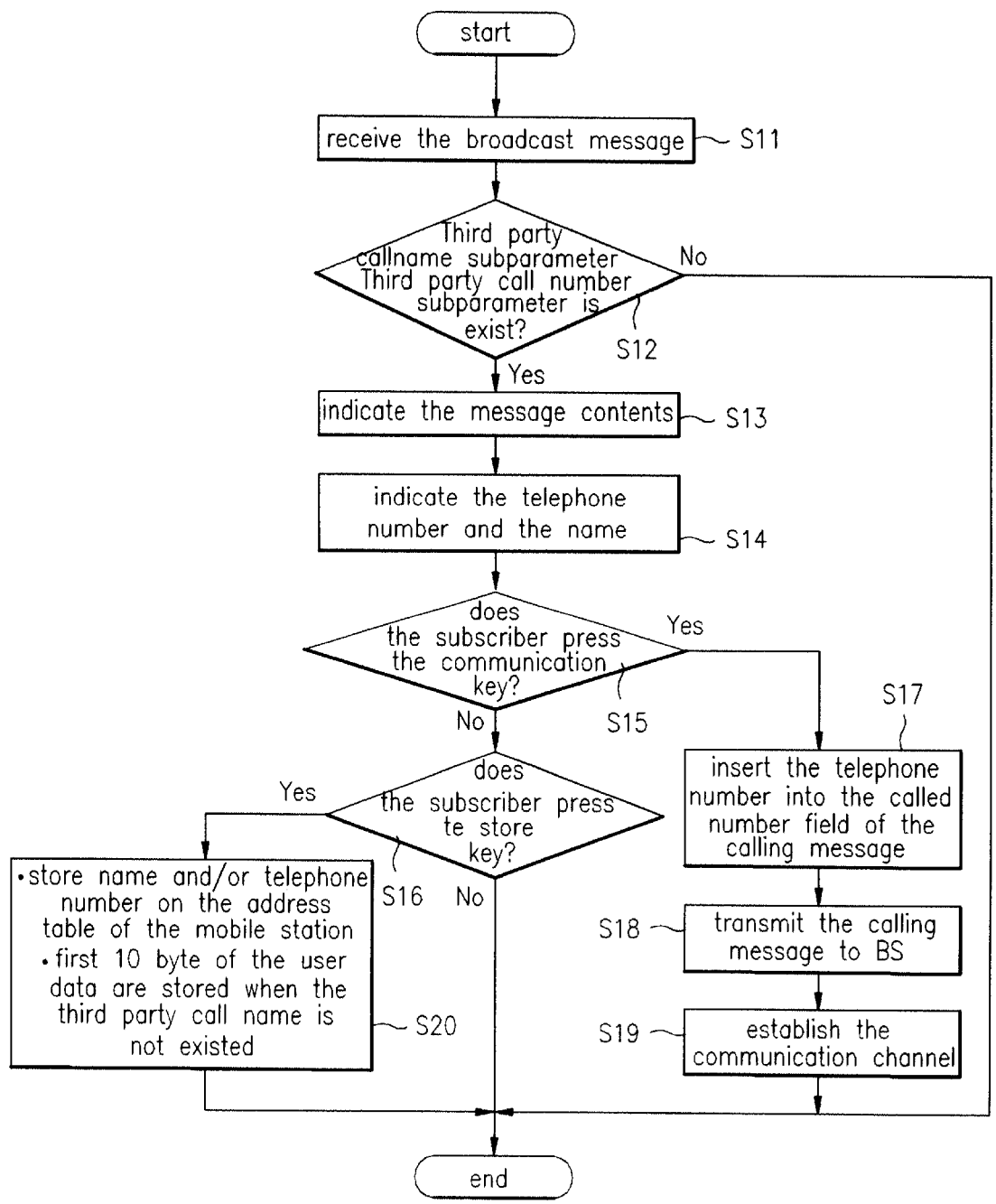
FIG. 8 is a flow chart showing the process for processing the broadcast message at a terminal according to the present invention.

Referring to FIG. 8, the process for the subscriber terminal (mobile station) 4 to receive the broadcast message from the base station 3 is explained as follows.

The terminal 4 decides whether there are two subpararmeters for the third party call number and the third party call name, or one of them.

Whether these two subparameters are added or one of them is added is the provider's option. If the subparameters are not included, the terminal 4 performs a general process for the received broadcast message. For example, if the subparameters (the third party call number and the third party call name) are in the broadcast message, the terminal 4 displays the contents of the broadcast message, the telephone number and name of the information provider on the display device in a certain sequence. In order to display the information, four sequences may be considered. As the first example, the terminal 4 displays the contents of the broadcast message on the display device (for example, liquid crystal display) and then displays alternately the telephone number and name of the information provider included in the subparameters (the third party call number and the third party call name) after a constant time (for example, one or two seconds) is passed. As the second example, the contents of the broadcast message and both the telephone number and the name of the information provider may be displayed on the display device at the same time. As the third example, the contents of the broadcast message are first displayed on the display device and after then, both the telephone number and the name of the information provider may be displayed on the display device at the same time. As the fourth example, the name of the information provider is first displayed on the display device and then the contents of the broadcast message may be displayed on the display device. Hence, the terminal 4 decides whether the user or the service subscriber presses the communication key on the keypad. Any key may be assigned to this communication key by the terminal provider. This communication key is to be used when the service subscriber of the terminal side wants to communicate with the information provider by using the telephone number of the information provider who provides the broadcast message. Therefore, if the communication key is pressed by the service subscriber, the telephone number of the information provider is inserted into the field parameter (called number) of the origination message. This origination message is transmitted from the terminal (mobile station) 4 to the base station 3 of FIG. 1. The base station 3 established a traffic channel between the service subscriber of the terminal side 4 and the information provider. The process for establishing the traffic channel is performed according to the standardization without any relation to the present invention and therefore the explanation for the establishing process is omitted here.

On the other hand, if the communication key is not pressed by the service subscriber even though the telephone number and the name are displayed, the terminal 4 checks whether or not the subscriber presses the store key on the keypad. This store key may be assigned by the terminal provider. This store key is used for the service subscriber to store the telephone number and/or the firm name of the information provider included in the subparameters (third party call name and third party call number) in the address directory of the terminal 4 so that the service subscriber can communicate with the information provider in the future. The name (or firm name) is stored in the name field of the address directory and the telephone number is stored in the number field. Therefore, as in FIG. 8, when the service subscriber presses the store key, the telephone number and the name of the information provider are stored in the address directory of the terminal 4. Then, the telephone number of the information provider may optionally be stored in the address directory or both the telephone number and the name may be stored. According to the present invention, the following effects may be obtained.

There may be the case that the subparameter third party call name to insert the name of the information provider does not exist in the broadcast message received by the terminal. This may be the case that the information provider of the broadcast message does not provide the name by mistake or on purpose intentionally when the provider transmits the transmission request message of the broadcast message to the cell broadcast center.

In this case, the terminal user may press the store key when the user wants to store the name as well ad the telephone number of the information provider. However, this is the case that the subparameter third party call name does not exist in the received broadcast message. If the result of the process for the terminal 4 to check whether or not there is the subparameter third party call name in the received broadcast message is that the subparameter does not exist, the terminal extracts the first ten bytes of the subparameter (user data) including the broadcast message content among the subparameters shown in FIG. 6 and then stores the data of the extracted ten bytes in the name field of the terminal address directory. Therefore, for this case, without regard to whether or not the subparameter (third party call name) exists, it is possible to store the telephone number in a classified order. Therefrom, the terminal user can easily find the telephone number that the user wants from the address directory.

First, when the service subscriber of the terminal 4 side wants to communicate with the provider of the broadcast message, by simply pressing the communication key, the subscriber can easily make the communication.

Second, by simply pressing the store key, the subscriber can store the telephone number and the name of the information provider in the address directory of the terminal.

What is claimed is:

1. A method of providing a broadcasting message service in a communication system, comprising:

receiving a transmission request message for a short message service broadcast message from an information provider to a messaging center, the transmission request message including a telephone number of the information provider;

processing the telephone number of the information provider by the messaging center to include it in a telephone number subparameter of the broadcast message to be transmitted in addition to a user data subparameter of the broadcast message;

transmitting the broadcast message from the messaging center to a plurality of terminals through a base station;

receiving the broadcast message, including the telephone number subparameter, at each of the plurality of terminals;

displaying the contents of the telephone number subparameter and the user data subparameter on a display device of the terminal;

at least one of (a) storing the contents of the telephone number subparameter and (b) initiating communications with the information provider using the telephone number provided in the telephone number subparameter in accordance with an input command;

determining whether or not a store key of at least one of the plurality of terminals is pressed; and when the store key is pressed, storing the telephone number of the information provider in a number field of an address directory of said terminal, wherein the at least one terminal stores a prescribed number of bytes of the contents of the user data subparameter as the name of said information provider in a name field of the address directory of said terminal.

2. The method of claim 1, further comprising storing the telephone number of the information provider in a directory of the terminal when a storing input command is received.

3. The method of claim 2, further comprising receiving a name of the information provider in a name subparameter of the broadcast message, and storing the name of the information provider and the telephone number of the information provider in the directory of the terminal when the storing input command is received.

4. The method of claim 1, wherein the step of processing the telephone number of the information provider comprises:

checking whether or not the information provider wants to transmit the telephone number of the information provider according to an option of the information provider; and inserting the telephone number of the information provider into the telephone number subparameter of the broadcast message if the information provider wants to transmit its telephone number.

5. The method of claim 1, wherein the step of displaying the contents of the telephone number subparameter and the user data subparameter on the display device of the terminal comprises displaying the telephone number and a name of the information provider together with the user data of the broadcast message on the display device of the terminal at the same time.

6. The method of claim 1, wherein the step of displaying the contents of the telephone number subparameter and the user data subparameter on the display device of the terminal comprises:

first displaying the contents of the user data subparameter; and alternately displaying the contents of the telephone number subparameter and a name of the information provider.

7. The method of claim 1, wherein the step of displaying the contents of the telephone number subparameter and the user data subparameter on the display device of the terminal comprises:

first displaying the contents of the user data subparameter; and simultaneously displaying both the contents of the telephone number subparameter and a name of the information provider on the display device.

8. The method of claim 1, wherein the step of displaying the contents of the telephone number subparameter and the user data subparameter on the display device of the terminal comprises:

first displaying one of a name and the telephone number of the information provider on the display device; and displaying the user data of the broadcast message on the display device.

9. A method of processing a broadcast message in a mobile terminal, comprising:

receiving a short message service broadcast message provided by an information provider;

verifying that a user data subparameter exists in the broadcast message;

determining whether or not at least one contact subparameter exists containing at least a telephone number of the information provider in addition to the user data subparamerer in the broadcast message;

when the at least one contact subparameter exists, displaying the contents of the at least one contact subparameter and the contents of the user data subparameter on a display device of the terminal in a prescribed sequence;

determining whether or not a communication key of the mobile terminal is pressed;

inserting the telephone number of the information provider from the contact subparameter into a receiver telephone number parameter of an origination message if the communication key is pressed;

transmitting the origination message to a base station to establish a traffic channel to the information provider;

determining whether or not a store key of the terminal is pressed; and when the store key is pressed, storing the telephone number of said information provider in a number field of an address directory of said terminal, wherein when the at least one contact subparameter is a third party call number, said terminal stores a prescribed number of bytes of the contents of the user data subparameter as the name of said information provider in a name field of the address directory of said terminal.

10. The method of claim 9, wherein the step of displaying the contents of the at least one contact subparameter and the data of the broadcast message on the display device of the terminal in the prescribed sequence comprises simultaneously displaying the contents of the user data subparameter and the contents of the at least one contact subparameter.

11. The method of claim 9, wherein the step of displaying the contents of the at least one contact subparameter and the data of the broadcast message on the display device of the terminal in the prescribed sequence comprises:

first displaying the contents of the user data subparameter on the display device;

displaying the contents of the at least one contact subparameter; and when more than one contact subparameter exists, alternately displaying contents of each contact subparameter telephone number and said name on the display device.

12. The method of claim 9, wherein the step of displaying the contents of the at least one contact subparameter along with the data of the broadcast message on the display device of the terminal in the prescribed sequence comprises:

first displaying the contents of the user data subparameter; and simultaneously displaying contents of the at least one contact subparameter on the display device wherein the contents of the at least one contact subparameter include the telephone number and name of the service provider.

13. The method of claim 9, wherein the step of displaying the contents of the at least one contact subparameter along with the data of the broadcast message on the display device of the terminal in the prescribed sequence comprises:

first displaying the contents of the at least one contact subparameter on the display device; and displaying the contents of the user data subparameter on the display device.

14. The method of claim 1, wherein the telephone number of said information provider is stored in a name field of the address directory of said terminal together with the name of said information provider.

15. The method of claim 1, wherein the step of processing comprises:

determining whether or not the information provider wants to transmit at least one of the telephone number and a name of the information provider according to an instruction of the information provider.

16. The method of claim 1, wherein the step of processing comprises forming a name of the information provider into the user data subparameter of the broadcast message and forming the telephone number of the information provider into the telephone number subparameter of the broadcast message if the information provider has instructed the messaging center to transmit this information with the broadcast message.

17. The method of claim 16, wherein the user data subparameter is a first subparameter, and wherein the telephone number subparameter is a second subparameter.

18. The method of claim 1, wherein if the broadcast message contains no subparameter for a name of the information provider and includes the telephone number subparameter, and the user of the terminal attempts to store the information provider's information, the first 10 bytes of the contents of the broadcast message that are user data are stored in the name field of an address directory instead of the information provider's name.

19. The method of claim 1, further comprising a name subparameter.

20. The method of claim 1, wherein the telephone number of the information provider stored in the telephone number subparameter is available to be used by the terminal.

21. The method of claim 1, wherein a name of the information provider is stored in a first 10 bytes of the user data field.

22. The method of claim 4, wherein the step of receiving a transmission request message further comprises:

receiving a name of the information provider;

determining whether the information provider wants to include the name of the information provider in the broadcast message;

processing the name of the information provider to include it in a subparameter of the broadcast message if it is determined that the information provider wants to include the name in the broadcast message; and displaying the name of the information provider on the display device of the terminal when the broadcast message is received.

23. The method of claim 22, wherein the name of the information provider is stored in the first 10 bytes of the user data subparameter.

24. The method of claim 9, wherein if the broadcast message contains no subparameter for the third party call name and includes a parameter for third party call number, and the user of the terminal attempts to store the third party call information, the first 10 bytes of the contents of the user data subparameter are stored in the name field of an address directory instead of the information provider's name.

25. A method of providing a short message service in a communication system, comprising:

forming a broadcast message for a short message service from an information provider to be broadcast from a cell broadcast center through a base station to at least one subscriber unit, the message including a first subparameter identifying a telephone number of the information provider and at least one second subparameter including data provided by the information provider;

broadcasting the broadcast message to the at least one subscriber unit from the cell broadcasting center through the base station;

determining whether or not a store key of the at least one subscriber unit receiving the broadcast message is pressed; and when the store key is pressed, storing the telephone number of said information provider in a number field of an address directory of the at least one subscriber unit, wherein the at least one subscriber unit stores a prescribed number of bytes of the contents of the second subparameter as a name of said information provider in a name field of the address directory of the at least one subscriber unit.

26. The method of claim 25 wherein a first portion of the at least one second subparameter includes a name of the information provider.

27. The method of claim 25, wherein the at least one subscriber unit receives the broadcast message and displays a content of at least one second subparameter along with the telephone number in the first subparameter.

28. The method of claim 25, wherein the subscriber unit can include the telephone number provided in the first subparameter in an origination message to initiate a call to the information provider.

29. The method of claim 25, further comprising:

prior to forming the message, receiving a broadcast message transmission request, including the name and telephone number of the information provider; and processing the name and telephone number of the information provider to be included in separate subparameters of the broadcast message.

30. The method of claim 29, wherein the processing includes determining if the information provider has indicated in the broadcast message transmission request that the name and telephone number of the information provider should be included in the broadcast message.

31. A subscriber unit for a mobile communication system, comprising:

means for receiving a broadcast message from an information provider through a cell broadcasting center, the broadcast message including at least a first subparameter identifying a telephone number of the information provider and a second subparameter identifying information to be displayed on a display of the subscriber unit;

means for at least one of initiating communication to the information provider using the first subparameter of the broadcast message and storing the telephone number of the information provider using the first subparameter of the broadcast message;

means for determining whether or not a store key of the subscriber unit is pressed; and when the store key is pressed, means for storing the telephone number of said information provider in a number field of an address directory of said subscriber unit, wherein the subscriber unit stores a prescribed number of bytes of the contents of the second subparameter as the name of said information provider in a name field of the address directory of said subscriber unit.

32. A method of performing a call back function in a communication terminal, comprising:

receiving a short message service (SMS) delivery message at the communication terminal, the SMS delivery message including a subparameter for a third party telephone number in addition to a user data subparameter;

displaying the third party telephone number on a display of the communication terminal;

determining whether or not a store key of the communication terminal is pressed; and when the store key is pressed, storing the third party telephone number in a directory of the communication terminal for performing a call back;

wherein said communication terminal stores a prescribed number of bytes of the contents of the user data subparameter as the name of the third party in a name field of the directory of said communication terminal.

33. The method of claim 32, further comprising initiating communications with a third party using the stored third party telephone number.

34. The method of claim 32, further comprising initiating communications with a third party using the stored third party telephone number when a command is received at the communication terminal.

35. The method of claim 32, wherein the SMS delivery message further includes a message identifier subparameter and a user data subparameter.

36. A method of performing a call back function in a communication terminal, comprising:

receiving a short message service (SMS) delivery message at the communication terminal, the SMS delivery message including a first subparameter for a third party telephone number and a second subparameter for a third party name;

displaying the third party telephone number and the third party name on a display of the communication terminal; and storing the third party telephone number in a directory of the communication terminal for performing a call back.

37. The method of claim 36, further comprising initiating communications with a third party using the stored third party telephone number.

38. The method of claim 36, further comprising initiating communications with a third party using the stored third party telephone number when a command is received at the terminal.

39. The method of claim 36, wherein the SMS delivery message further includes a message identifier subparameter and a user data subparameter.

40. A short message service message, comprising:

a first subparameter for a message identifier;

a second subparameter for a user data; and a third subparameter for a third party telephone number, wherein if the short message service (SMS) message contains no subparameter for a name of the third party and a user of a terminal receiving the SMS message presses a store key of the terminal to store the third party telephone number, a prescribed number of bytes of the contents of the second subparameter are stored as a name of the third party in a name field of a directory of the terminal in addition to the third party telephone number.

41. The message of claim 40, further comprising a fourth subparameter for a third party name.

42. The message of claim 40, further comprising at least one of a fourth subparameter for a message center time stamp, a fifth subparameter for a validity period-absolute, a sixth subparameter for a validity period-relative, a seventh subparameter for a priority indicator, an eighth subparameter for an alert on message delivery, and a ninth subparameter for a language indicator.

43. A method of performing a call back function in a communication system having a plurality of stations, comprising:

transmitting a short message service (SMS) delivery message from any one of the plurality of stations to at least one other station, the SMS delivery message including a subparameter for a third party telephone number and a subparameter for user data;

displaying the third party telephone number on a display of each of the at least one other station to which the SMS delivery message was transmitted;

at least one of storing the third party telephone number from the subparameter to a directory of the at least one other station and forming an origination message using the subparameter to initiate communications to the third party;

determining whether or not a store key of the at least one other station is pressed; and when the store key is pressed, storing the third party telephone number in a number field of an address directory of the at least one other station, wherein the at least one other station stores a prescribed number of bytes of contents of the user data subparameter as the name of the third party in a name field of the address directory of the at least one other station.

44. The method of claim 43, wherein the plurality of stations comprises at least one of mobile terminals and base stations.

45. The method of claim 44, further comprising initiating communications with a third party using the stored third party telephone number from at least one mobile terminal.

46. The method of claim 44, further comprising initiating communications with a third party using the stored third party telephone number from at least one mobile terminal when a command is inputted at the at least one mobile terminal.

47. A method of performing a call back function in a communication system having a plurality of stations, comprising:

transmitting a short message service (SMS) delivery message from any one of the plurality of stations to at least one other station, the SMS delivery message including a subparameter for a third party telephone number, a subparameter for a third party name, and a user data subparameter;

displaying at least one of the third party telephone number and the third party name on a display of each of the at least one other stations to which the SMS delivery message was transmitted; and at least one of the storing the third party telephone number and the third party name from the corresponding subparameters to a directory of each of the at least one other station and forming an origination message using the third party telephone number subparameter to initiate a call to the third party telephone number, wherein if the subparameter for the third party name contains no data and a user of a terminal receiving the SMS message presses a store key of the terminal to store the third party telephone number, a prescribed number of bytes of the contents of the user data subparameters are stored as a name of the third party in a name field of a directory of the terminal in addition to the third party telephone number.

48. The method of claim 47, wherein the plurality of stations comprises at least one of mobile terminals and base stations.

49. The method of claim 48, further comprising initiating communications with a third party using the stored third party telephone number from at least one mobile terminal having received the SMS delivery message.

50. The method of claim 48, further comprising initiating communications with a third party using the stored third party telephone number from at least one mobile terminal having received the SMS delivery message when a command is inputted at the at least one terminal.

51. A method of providing a broadcasting message service in a communication system having a messaging center, an information provider, and a terminal, comprising:

transmitting a third party telephone number with a transmission request from the information provider to the messaging center;

processing the third party telephone number at the messaging center to include it in a third party telephone number subparameter of a short message service (SMS) delivery message in addition to a user data subparameter of the short message;

receiving at the terminal the SMS delivery message including the third party telephone number subparameter sent through a base station;

displaying the third party telephone number on a display of the terminal;

at least one of storing the third party telephone number from the third party telephone number subparameter to a directory of the terminal and forming an origination message using data from the third party telephone number subparameter;

determining whether or not a store key of the terminal is pressed; and when the store key is pressed, storing the telephone number of said information provider in a number field of an address directory of said terminal, wherein said terminal stores a prescribed number of bytes of the contents of the user data subparameter as the name of said information provider in a name field of the address directory of said terminal.

52. The method of claim 51, further comprising initiating communications with a third party using the stored third party telephone number at the terminal.

53. The method of claim 51, further comprising initiating communications with a third party using the stored third party telephone number when a command is inputted at the terminal.

54. The method of claim 51, wherein the SMS delivery message further includes at least one of a subparameter for a message center time stamp, a subparameter for a validity period-absolute, a subparameter for a validity period-relative, a subparameter for a priority indicator, a subparameter for an alert on message delivery, and a subparameter for a language indicator.

55. A method of providing a broadcasting message service in a communication system having a messaging center, an information provider, and a terminal, comprising:

transmitting a third party telephone number and a third party name with a transmission request from the information provider to the messaging center;

processing the third party telephone number and the third party name at the messaging center to include it in a third party telephone number and a third party name subparameter of a short message service (SMS) delivery message;

receiving at the terminal the short message including the third party telephone number and third party name subparameter transmitted through a base station;

displaying at least one of the third party telephone number and the third party name on a display of the terminal;

determining whether or not a store key of the terminal is pressed; and storing the third parry telephone number and the third party name in a directory of the terminal;

wherein when the third parry name subparameter contains no data, said terminal stores a prescribed number of bytes of contents of a user data subparameter as the name of said information provider in a name field of the address directory of said terminal.

56. The method of claim 55, wherein the third party telephone number and third party name subparameter comprises a first subparameter to store the third party telephone number, and a second parameter to store the third party name.

57. The method of claim 55, further comprising initiating communications at the terminal with a third party using the stored third party telephone number.

58. The method of claim 55, further comprising initiating communications at the terminal with a third party using the stored third party telephone number when a command is inputted at the terminal.

59. The method of claim 1, further comprising storing a first prescribed number of bits of user data from the user data subparameter in a memory location with the contents of the telephone number subparameter.

60. The method of claim 9, further comprising storing the contents of the at least one contact subparameter in a memory location and storing a first prescribed number of bytes of user data from the user data subparameter in the memory location with the contents of the at least one contact subparameter.

61. The device of claim 60, wherein the first subparameter comprises a third party telephone number subparameter and wherein the second subparameter comprises a user data subparameter.

62. The method of claim 1, wherein the terminal stores the first ten bytes of the contents of the user data subparameter as the name of said information provider in the name field of the address directory of said terminal.

63. The device of claim 31, further comprising means for storing a first prescribed number of bits of the second subparameter with the contents of the first subparameter.

64. The method of claim 35, further comprising storing a first prescribed number of bits of user data from the user data subparameter in the directory of the communication terminal with the contents of the third party telephone number subparameter.

65. The method of claim 36, wherein the second subparameter comprises a user data subparameter, and wherein a first prescribed number of bytes of the user data subparameter are designated as the third party name.

66. The message of claim 40, wherein a first prescribed number of bytes of the second subparameter are designated as a third party name if no third party name subparameter is provided in the message.

67. The message of claim 66, wherein the first prescribed number of bytes is 10.

68. The method of claim 43, further comprising storing a first prescribed number of bits of user data from a user data subparameter of the SMS delivery message in the directory with the third party telephone number.

69. The method of claim 47, wherein the subparameter for the third party name comprises a first prescribed number of bytes of a user data subparameter of the SMS delivery message.

70. The method of claim 69, wherein the first prescribed number of bytes is 10.

71. The method of claim 51, further comprising storing a first prescribed number of bits of user data from the user data subparameter in the directory with the third party telephone number.

72. The method of claim 55, wherein the third party name subparameter comprises a first prescribed number of bytes of a user data subparameter of the SMS delivery message.

73. The method of claim 72, wherein the first prescribed number of bytes is 10.

* * * * *